E. G. Passmore,
Harvester Rake.

No. 3396

Reissued April 20, 1869

Witnesses { Wm Albert Stark.
M. P. Delaney

E. G. Passmore
By his Atty
H. Howson

Figure 2:
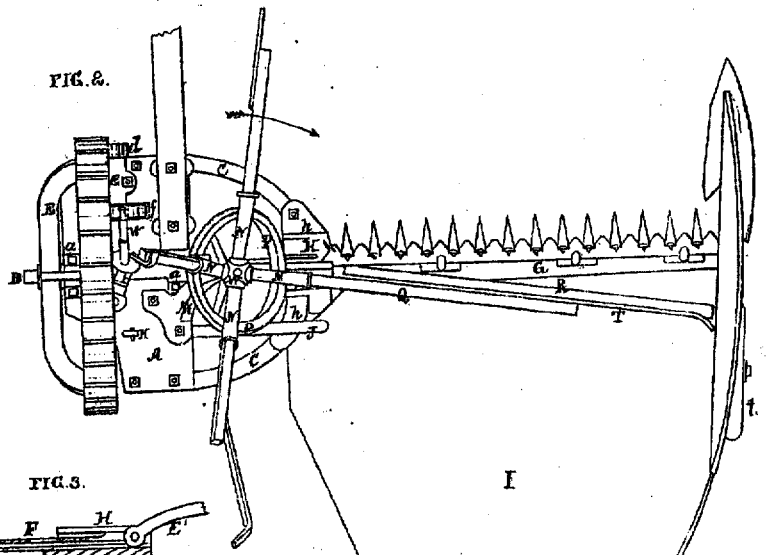

2 Sheets Sheet 2.
E. G. Passmore. Jr.
Harvester Rake.
No. 3396.
Reissued. April 20. 1869.
Fig 2.
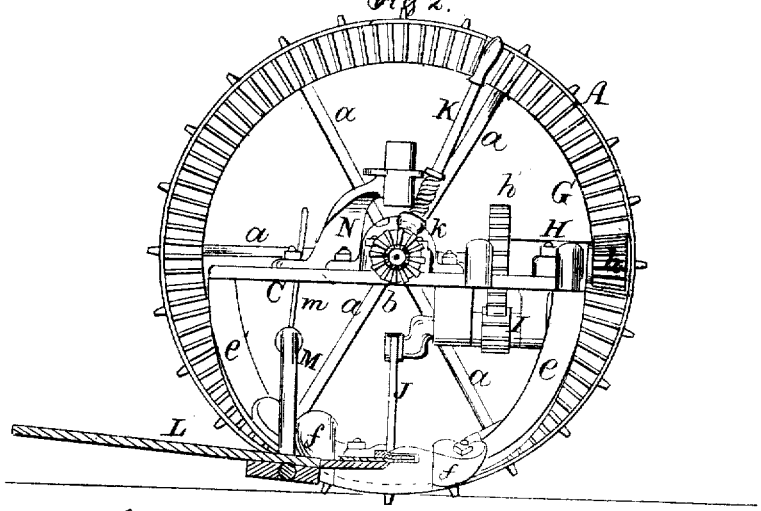
Fig 3.
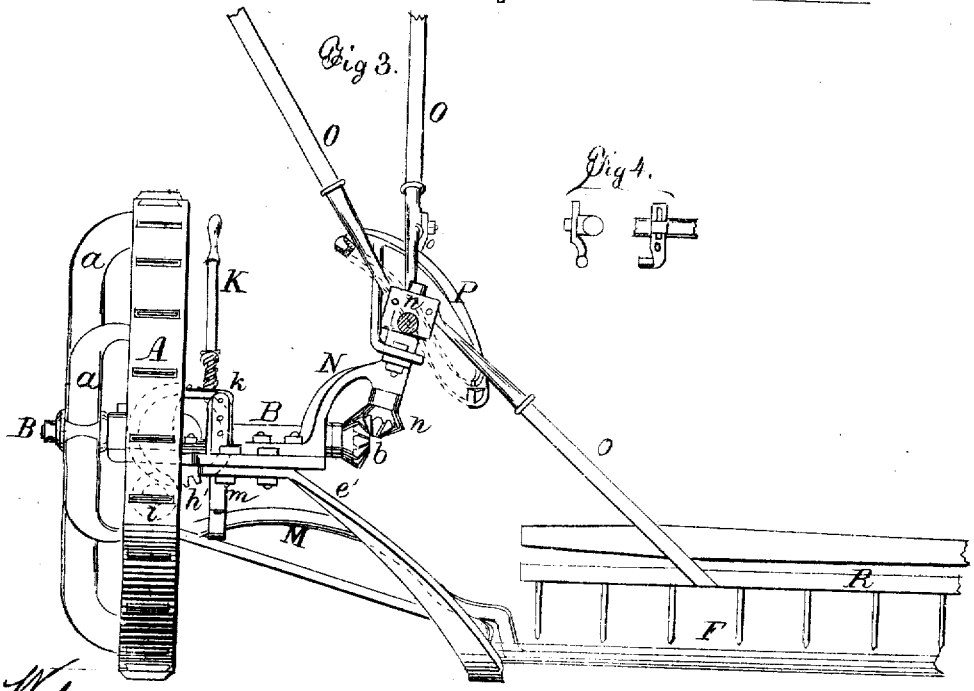
Fig 4.
Witnesses
Joe S. Peyton
Battis DeLong.
E. G. Passmore
by his Atty
Wm. D. Baldwin

UNITED STATES PATENT OFFICE.

EVERETT G. PASSMORE, OF PHILADELPHIA, PENNSYLVANIA.

IMPROVEMENT IN HARVESTERS.

Specification forming part of Letters Patent No. 53,862, dated April 10, 1866; Reissue No. 3,396, dated April 20, 1869.

*To all whom it may concern:*

Be it known that I, EVERETT G. PASSMORE, of the city and county of Philadelphia, in the State of Pennsylvania, have invented certain new and useful Improvements in Harvesters, of which the following is a full, clear, and exact description.

The object of the first part of my invention is to combine in one machine a floating-bar mower, a rigid-bar reaper, and a combined revolving reel and rake; and the improvement consists in a novel method of combining, in a harvester, a main frame about on a level with the main axle, a shoe rigidly braced to said frame, a finger-beam hinged to said shoe, a stiffening-bar to render the finger-beam rigid, and a combined rake and reel revolving on an axis substantially in the line of the main axle.

The improvement further consists in a novel method of combining, in a harvester, a single driving-wheel, a frame located entirely on the grain side of said wheel, a finger-beam projecting laterally from said frame, substantially in the line of the main axle, and a combined rake and reel revolving on an axis in substantially the same vertical plane as the main axle.

The improvement further consists in a novel method, hereinafter described, of driving a series of combined rake and reel arms supported on the main frame between the driving-wheel and shoe directly from the main axle.

The object of the next part of the invention is to stop and start both the cutting and raking mechanism simultaneously; and the improvement consists in a novel method of combining a driving-wheel mounted on an axle turning freely, and sliding endwise in bearings on the main frame, and carrying a gear-wheel with raking and reeling devices mounted on said frame and driven by gearing from said axle, so that both the raking and cutting devices are stopped or started simultaneously by moving the wheel.

The improvement further consists in a novel method of combining independent rake and reel arms with a stationary cam-guide and with adjustable hooks on the arms fitting into the grooves to guide the rakes and beaters.

In the accompanying drawings I have shown all my improvements as embodied in one machine, which is to be provided with all the requisites of a fully organized harvester—such as guards, cutters, a divider, &c.

Figure 1:
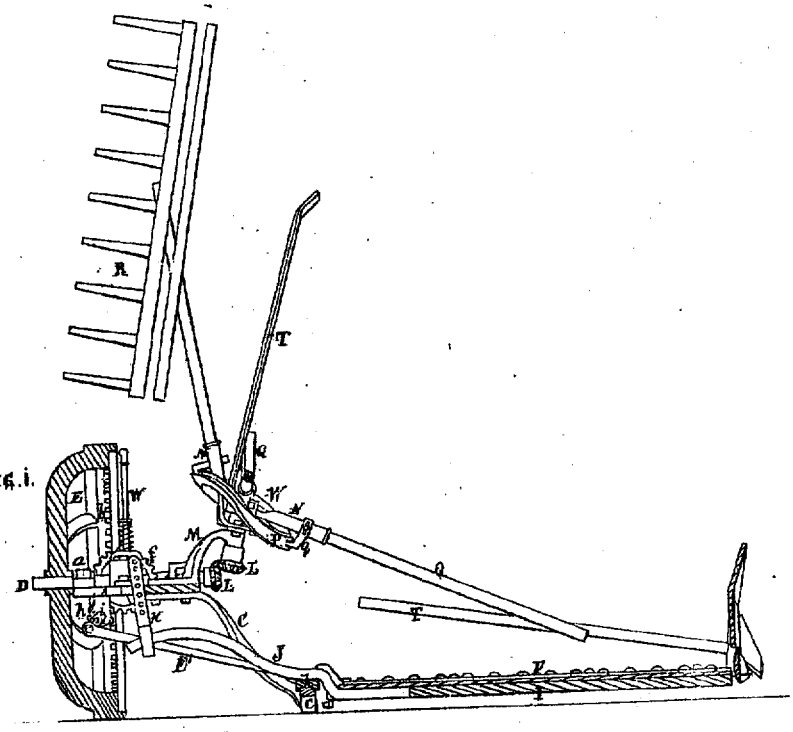
Figure 3:
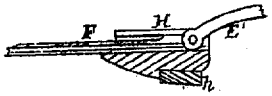
Figure 4:
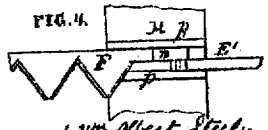

Figure 1 is a plan or top view of my improved harvester with a portion of the platform broken away. Fig. 2 is a view, in elevation, of the same as seen from the divider side, with the rake removed and the platform in section. Fig. 3 is a similar view of the same as seen from the rear, with the finger-beam and rake-arms partially broken away. Fig. 4 shows a side and an edge view of the adjustable rake-guides.

The driving-wheel A is cast with arms *a* projecting on the stubble side thereof, and turns with an axle, B, which revolves freely in suitable boxes on the main frame C. This frame, in this instance, consists of a single plate of cast metal, which projects partly into the concave of the wheel, but does not extend beyond the wheel on the stubble side.

The machine is drawn by a rigid tongue, D. A shoe, E, is rigidly connected with the main frame by curved arms *e e′*, respectively attached to the front and rear of plate C, to leave room for the other mechanism, hereinafter described.

A finger-beam of well-known construction is hinged at its heel end to play vertically on its pivots *f* in the shoe, and in this instance is in the same vertical plane as the main axle B. As the weight of the machine preponderates on the grain side the shoe E always runs upon the ground and conforms to its surface.

A bevel-wheel, G, inside the driving-wheel, drives an inverted bevel-pinion, *h*, on a counter-shaft, H, carrying a spur-wheel, *h′*, which gears into a corresponding pinion, *i*, on a crank-shaft, I, vertically below and parallel with the counter-shaft. Both of these wheels, it will be observed, are partially inclosed within the rim of the driving-wheel and parallel to its face. The shaft I drives the cutters in the usual way by a pitman, J, which in this instance I have arranged in the same vertical plane as the main axle. In order to stop or start the cutters the driving-wheel A is moved endwise with its axle B by means of a shipping-lever, K, working in an eccentric slot in an arch, *k*, and thus throws the wheels G *h* into or out of gear, as required.

In order to adapt the machine to reaping, I bolt a platform, L, to the finger-beam in any well-known way. A stiffening-bar, M, curves up from the platform, passes between the coupling-arms *c c'*, and enters the eye of an adjustable loop or stirrup, *m*. Pins are inserted through any one of a series of holes in the loop, to set it higher or lower to suit the adjustment of the platform.

A bevel-wheel, *b*, on the end of the main axle B, drives a corresponding pinion, *n*, on the lower end of a shaft revolving in bearings in a bracket, N, projecting from the main frame, so as to sustain the rake-axis in the same vertical plane as the main axle, as shown in Fig. 2, but projecting beyond the end of the main axle B and slightly inclined, as shown in Fig. 3.

Combined rake and reel arms O are pivoted to play vertically, independently of each other, in the head *n'* of the rake-shaft. Adjustable guides *o* on the arms O enter a groove in a guide-cam, P, fixed on the bracket, which causes the arms to rise and fall in the usual way, as they revolve around their axis to pass over the main frame to descend into the standing grain and to sweep over the platform. One arm only is usually provided with a rake, R, the other arms carrying beaters only. A mower must have a jointed or floating bar, or it cannot conform to the undulations of the ground; but this is not only unnecessary, but inexpedient in a reaper, and especially in a self-raking reaper, for in this latter class it becomes necessary, in order to secure good work, to mount the rake directly on the hinged finger-beam or its platform, in order that the rake and platform may always work in the same relative position. This plan I believe to be objectionable, as the relation of the rake to the main frame is constantly varying, and as much strain and friction is necessarily caused by the distance between the driving-power and the rake, and the cumbersome driving-gearing necessarily employed.

It will be seen, on the contrary, that my invention combines the advantages of a hinged-joint mower, a harvester, and a self-raker, in one very simple and effective machine.

What I claim herein as my invention is—

1. The combination of a main frame, a rigid shoe, a hinged finger-beam, a platform and its stiffening-bar, with a combined reel and rake revolving on an axis vertical, or nearly so, in the line of the main axle and finger-beam, substantially as set forth.

2. The combination of a single driving-wheel, a frame located on the grain side of said wheel, a laterally-projecting finger-beam, and a combined rake and reel revolving on an axis, substantially vertical, in the line of the main axle and finger-beam, substantially as set forth.

3. The combination of an axle revolving in bearings on the main frame, with a driving-wheel fast on one of its ends, and with a gear on the other, and with a combined reel and rake revolving on an axis vertical, or nearly so, mounted on the main frame in the line of the main axle and finger-beam, and driven directly from the main axle, substantially as set forth.

4. The combination, substantially as herein set forth, of gearing for driving the cutting and raking devices, mounted on the main frame in a fixed relation thereto, with the driving-wheel and main axle sliding endwise on the main frame simultaneously, to stop and start both the cutting and raking devices.

5. The adjustable cam-hooks *o*, arranged and operating as set forth.

EVERETT G. PASSMORE.

Witnesses:

HENRY BALDWIN, Jr.

WM. B. DAYTON.